May 25, 1954     A. VAN DUYN     2,679,190
COMPUTING WEIGHING SCALE AND BASIC-PRICE
OPTICAL INDICATING MEANS
Filed March 30, 1951     3 Sheets-Sheet 1

FIG. I

INVENTOR:
ADRIANUS VAN DUYN
BY
Spencer, Johnston, Cook & Root
ATT'YS

*INVENTOR:*
ADRIANUS VAN DUYN
*BY*
Spencer, Johnston, Cook & Root
ATT'YS

May 25, 1954

A. VAN DUYN 2,679,190

COMPUTING WEIGHING SCALE AND BASIC-PRICE OPTICAL INDICATING MEANS

Filed March 30, 1951

INVENTOR:
ADRIANUS van DUYN
BY
Spencer, Johnston, Cook & Root
ATT'YS

Patented May 25, 1954

2,679,190

UNITED STATES PATENT OFFICE 2,679,190

COMPUTING WEIGHING SCALE AND BASIC-PRICE OPTICAL INDICATING MEANS

Adrianus Van Duyn, Hillegersberg, Rotterdam, Netherlands, assignor to U. S. Slicing Machine Company, Inc., La Porte, Ind., a corporation of Indiana Application March 30, 1951, Serial No. 218,423

Claims priority, application Great Britain March 20, 1950

6 Claims. (Cl. 88—24)

This invention relates to computing weighing scales of the type having adjustable basic-price indicating means and chart means provided with characters which indicate the computed value, i. e., the product of the weight and a basic-price and indicating means movable relatively to each other on application of the load to indicate the weight, a basic-price and the total price of the load (computed value).

Objects of the invention are to facilitate the reading of indications on such a scale, to enable the provision of an increased number of basic-price indications and corresponding computed values and moreover to facilitate the adjustment of the scale for a predetermined basic-price.

According to the invention the computed-value chart is provided with characters arranged in a plurality of series and each indicating the product of a basic-price and a number of weight units, an optical projector adapted to illuminate such a product and to project a magnified image thereof on a screen, said projector being adjustable over the chart from series to series and moreover manually operable adjustment means adapted to effect simultaneous correlative adjustment of the basic-price indicating means and said projector. Preferably the screen extends throughout the length of the chart.

In an important embodiment according to the invention a manually rotary mainly cylindrical member is provided, on which the basic prices are helically arranged. When such an embodiment is used in combination with a rotary cylindrical computed-value chart, a carriage is preferably adjustable in axial direction of both cylinders, said carriage carrying the optical projector as well as means for the illumination of an indication on the computed value chart and moreover provided with an indicator to show the basic-price, whereas a connection is provided between the cylinder for the basic-prices and the carriage in such a way that when the cylinder for the basic-prices is rotated the carriage is adjusted axially in a position in which a selected basic-price is indicated, while the projector is situated adjacent to the series of characters indicating the product of the weight multiplied by said indicated basic-price.

In this embodiment it is very convenient when the chart for the basic-prices can be very rapidly set by means of a manually settable member, a speed accelerating gear being provided between this member and said chart.

Preferably the manually adjustable member comprises a disc provided with finger holes.

The invention and further details thereof will now be further elucidated by means of the drawing which represents an example of a weighing scale according to the invention.

Figure 1:
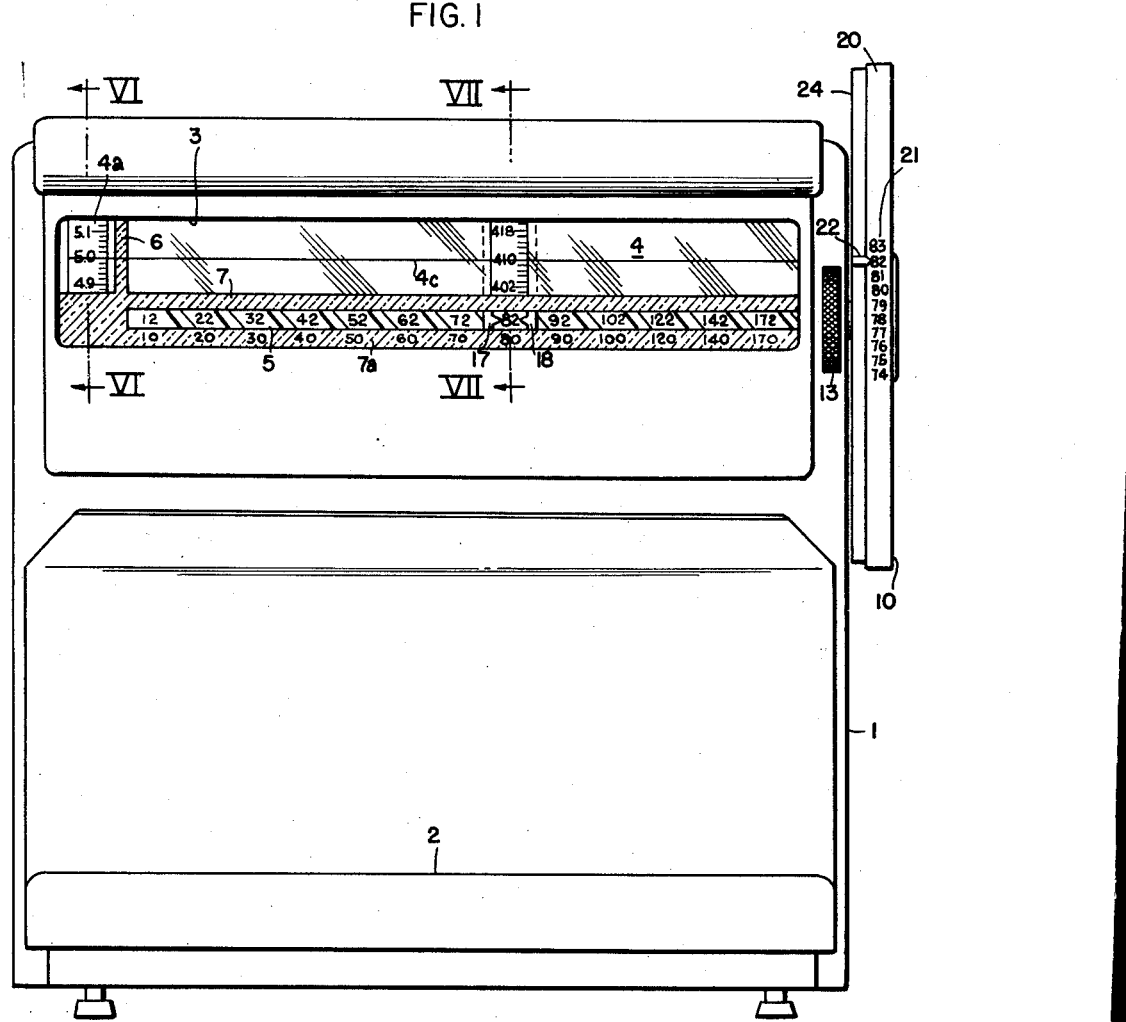
Figure 1 is a front view of the weighing device.
Figure 2:
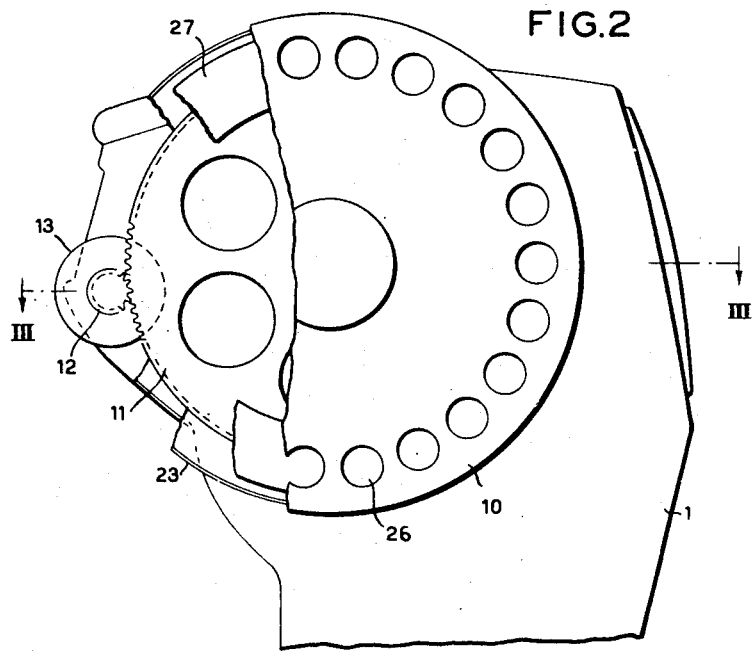
Figure 2 shows a side view thereof.

In Figure 1, the housing of the weighing device is indicated at 1 and the weighing-scale at 2. In the housing 1 a window 3 is provided with an elongated part 4 of ground glass and a normally transparent part 5. On the ground glass 4 strips 6, 7 and 7a are provided which are not transparent. The strip 7 or 7a is provided with clear marks indicating prices. The reading of the weight takes place on the glass part 4a by means of an optical reading device 8. At the same time the price reading takes place on the ground glass 4 with the aid of a movable optical reading device 9. The reading devices 8 and 9 comprise mainly a lamp 35, a lens system 36, a magnifying lens 37 and a screen 4, 4a for the magnified image of a character on a drum 34. The device 9 is movable longitudinally to the drum and co-operates with a fixed elongated mirror 38.

Figure 3:
Figure 3 is a section according to line III—III in Figure 2.
Figure 4:
Figure 4 shows a detail of the setting device on a larger scale.
Figure 5:
Figure 5 is a section according to line V—V in Figure 4.
Figure 6:
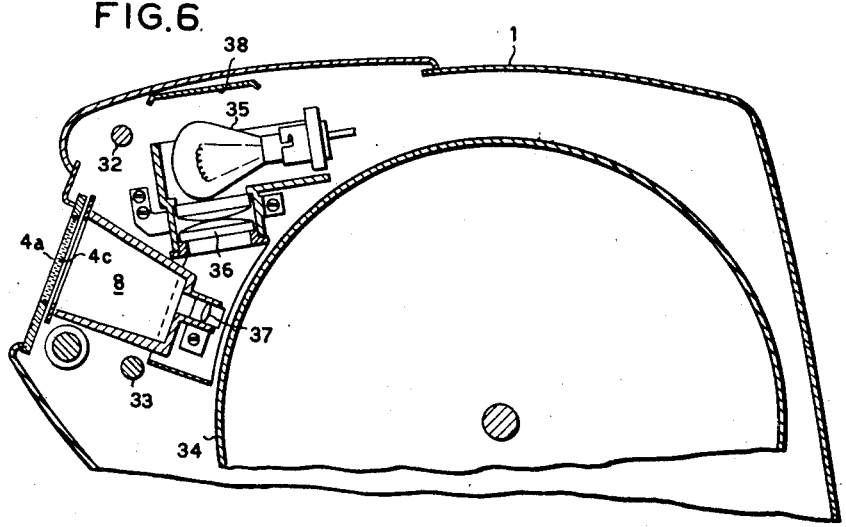
Figure 6 is a section on a larger scale according to line VI—VI in Figure 1.
Figure 7:
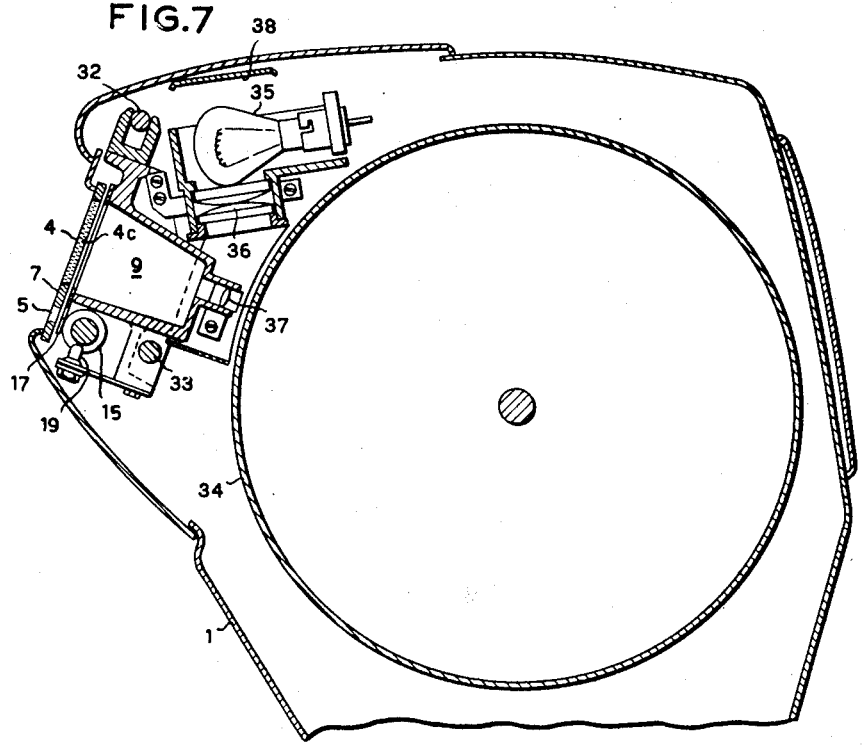
Figure 7 is a section on a larger scale according to line VII—VII in Figure 1.

On one of the side walls of the weighing device a setting disc 10 has been arranged which cooperates by means of toothed wheels 11 and 12 with a knob 13 for fine setting (see Figure 3). This knob 13 is connected with a shaft 14, provided with a helical groove 15 and also with a helically arranged series 16 of basic-prices. Two indicating members 17 and 18 are attached to the reading device 9 as well as a lug 19 which engages the groove 15 in the shaft 14. Rails 32 and 33 serve as a guide for the reading device 9. On the cylindrical chart 34 various computed values (products of basic prices and units) are arranged in very fine series. The setting disc 10 has a flanged edge 20 and may also carry on its periphery a price-scale 21. Further an indicating member 22 may be provided on the flange 23 of a stationary disc 24. The disc 10, which is connected with a toothed wheel 11 by means of a screw- or rivet connection 25 is provided with holes 26 in which a finger can be inserted for rotating the disc. To protect the finger tips from passing through openings 26 and becoming harmed by the sharp edges of the teeth on toothed wheel 11 a protective ring 27 is mounted on the toothed wheel 11 by means of pins or bolts 28 arranged at some distance from each other. The whole can revolve about a shaft 29 which is secured to the housing 1. A stop 30 on the protective ring 27 cooperates with a cam 31 on the disc 24 and serves to limit the movement of the reading device (Figures 4 and 5). This movement is effected by the cooperation of the lug 19 with the groove 15 in the shaft 14.

The screen 4 may have a curved cross section which is adapted to the curvature of the cylinder 34 in such a way that the projector on this screen 4 gives the sharpest possible image of the characters, at least in the neighborhood of the reading line 4c. This reading line extends throughout the screen 4.

The operation is as follows:

Prior to placing the load to be weighed on the scale the basic-price is adjusted. As the indicating means 17 and 18 of the reading device 9 will be arbitrarily positioned the price next to the desired basic price is first looked up on the strip 7 or 7a and in this way it is determined at about what place the device 9 must be set. Then the disc 10 is rotated by a finger and set at about the price desired by bringing the corresponding price mark opposite the indicating member 22. This is the rapid, coarse setting operation. By now rotating the preferably peripherally knurled knob 13 with the thumb a very accurate adjustment can also be obtained quickly. This is the fine setting operation. As in general the periphery of the helical price scale 16 will be larger than the periphery of the disc 10, the scale 16 is more accurate and can easily be read with the aid of the members 17 and 18.

If the load to be weighed is then placed on the scale 2 the weight is read at 4a and the total price (computed value) is to be viewed just over the set basic-price.

Figure 1 shows an example thereof.

The shape of the computed-value chart 34 may also differ from the cylindrical shape. For instance, it may be flat.

This application is a continuation-in-part of my copending application, Serial No. 185,973, filed September 21, 1950, issued May 19, 1953, as Patent 2,638,813.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. A computing weighing scale comprising a computed value chart on which the characters are arranged in a plurality of series each corresponding to a basic price, movable basic price indicating means, moving means for moving said basic price indicating means to display individual basic price characters, viewing means for said computed values adjustable over said computed value chart from series to series, adjustment means operable in response to movement of said basic price indicating means to effect simultaneous correlative adjustment of said viewing means with respect to said computed value chart, and manually settable members comprising a pair of discs, means connecting said discs with said moving means for said basic price indicating means, one of said discs being larger than the other for rough and fine adjustment, respectively, of said basic-price indicating means, said larger disc being provided with finger holes, and the periphery of the smaller disc being situated adjacent to said larger disc in such a way that the fingers may engage the finger holes of the larger disc and the thumb the periphery of the smaller disc.

2. A computing weighing scale comprising a computed value chart on which the characters are arranged in a plurality of series each corresponding to a basic price, movable basic price indicating means, moving means for moving said basic price indicating means to display individual basic price characters, viewing means for said computed values adjustable over said computed value chart from series to series, adjustment means operable in response to movement of said basic price indicating means to effect simultaneous correlative adjustment of said viewing means with respect to said computed value chart, and manually settable members comprising a pair of discs, means connecting said discs with said moving means for said basic price indicating means, one of said discs being larger than the other for rough and fine adjustment, respectively, of said basic price indicating means, said larger disc being provided with finger holes, and the periphery of the smaller disc being situated adjacent to said larger disc in such a way that the fingers may engage the finger holes of the larger disc and the thumb the periphery of the smaller disc, and speed accelerating means connected between said larger disc and said moving means.

3. In a setting device for a scale comprising a computed value chart, a basic price indicating means, and a viewing means for the characters on the computed value chart movable in response to a setting of the basic price indicating means, the combination of manual setting means comprising a pair of discs, means connecting said discs with said basic price indicating means to move said viewing means to a predetermined position in front of characters on the computed value chart corresponding to a predetermined basic price, one of said discs being larger than the other for rough and fine adjustment, respectively, of said basic price indicating means, said larger disc being provided with finger holes, the periphery of the smaller disc being situated adjacent to said larger disc in such a way that the fingers may engage the finger holes of the larger disc and the thumb the periphery of the smaller disc, and speed accelerating means connected between said larger disc and the means to move said viewing means.

4. A computing weighing scale comprising a rotary cylindrical computed-value chart on which the characters are arranged in a plurality of series each corresponding to a basic price, a manually rotatable substantially cylindrical basic-price chart with the characters arranged helically thereon and with its axis parallel to the axis of the computed-value chart, a carriage support means to support said carriage, said carriage being mounted on the support means and movable axially of the charts, an optical projector reading device mounted on the carriage including a light source and light condensing means adapted to illuminate the computed-value indication on said cylindrical chart and a lens supported on said carriage and adapted to project a magnified image of said indication, an elongated glass screen carried by said housing adapted to receive the projected magnified image, an operative connection between the basic-price chart and the carriage, whereby rotation of the basic-price chart effects axial adjustment of the carriage to a position in which a selected basic price is indicated and the projector is adjacent the series of computed values corresponding to the indicator basic price, means for manually rotating said basic-price chart including a large disc having finger holes therein for rough adustment and a smaller disc adjacent thereto for fine adjustment, and means connecting said discs with said basic-price chart.

5. A computing weighing scale comprising a rotary cylindrical computed-value chart on which the characters are arranged in a plurality of series each corresponding to a basic price, adjustable viewing means for said computed value chart, a rotatable substantially cylindrical basic-price chart with the basic price characters arranged helically thereon and with its axis substantially parallel to the axis of the computed-value chart, means for rotating said basic price chart including a pair of discs both connected thereto, one of said discs having finger holes therein and adapted for rough adjustment and the other disc adapted for fine adjustment, and adjustment means operable in response to the rotation of said basic-price chart to effect simultaneous correlative adjustment of the viewing means with respect to said computed value chart.

6. A computing weighing scale comprising a rotary cylindrical computed-value chart on which the characters are arranged in a plurality of series each corresponding to a basic price, viewing means for said computed-value chart adjustable from series to series of said computed-value chart along a path substantially parallel to the axis of said chart, a rotatable substantially cylindrical basic-price chart with the characters arranged helically thereon and with its axis substantially parallel to the axis of the computed-value chart, said basic price chart being provided with a helical groove, adjustment means operable in response to the rotation of said basic-price chart to effect simultaneous correlative adjustment of said viewing means with respect to said computed-value chart, said adjustment means comprising a carriage for said viewing means and a lug on said carriage cooperating with said groove, means for rotating said basic-price chart including a pair of discs, one of said discs having a plurality of finger holes therein and utilized for rough adjustment and the other disc being utilized for fine adjustment, and means connecting said discs to said basic-price chart.

References Cited in the file of this patent

UNITED STATES PATENTS

| Number | Name | Date |
|---|---|---|
| 1,407,987 | Crane | Feb. 28, 1922 |
| 1,487,514 | Goss | Mar. 18, 1924 |
| 1,619,121 | Hem | Mar. 1, 1927 |
| 1,715,074 | Platten | May 28, 1929 |
| 2,061,894 | Carlson | Nov. 24, 1936 |
| 2,189,825 | Waugh | Feb. 13, 1940 |
| 2,370,982 | Marshall | Mar. 6, 1945 |
| 2,541,365 | Kauffman | Feb. 13, 1951 |